United States Patent Office 2,919,266
Patented Dec. 29, 1959

2,919,266

POLYMERIZATION OF OLEFINS WITH A METAL HALIDE ON ACTIVATED CARBON CATALYST

James L. Lauer, Philadelphia, Pa., assignor to Sun Oil Company, Philadelphia, Pa., a corporation of New Jersey No Drawing. Application November 22, 1957
Serial No. 698,030

4 Claims. (Cl. 260—93.7)

This invention relates to a process for the polymerization of olefins, and more particularly to a process wherein a new catalyst system is used for such polymerization.

Olefins such as ethylene and propylene have heretofore been polymerized to relatively high molecular weight solid polymers through the use of metal halides such as titanium trichloride activated by materials such as the aluminum trialkyls, especially aluminum triethyl. Polymers prepared in this manner are solid materials having molecular weights above about 10,000 and usually from 50,000 to 500,000. A portion of the polymers thus prepared are crystalline, i.e., exhibit a crystalline structure by X-ray analysis. This crystalline polymer is relatively insoluble in the usual hydrocarbon solvents, such as, for example, the hexanes, octanes, and decanes, except at relatively high temperatures. This insolubility provides a method of separating crystalline polymers from amorphous polymers which are also formed by the process, since the amorphous polymers are quite soluble in such hydrocarbons. The crystalline polymers have many desirable properties which make them suitable for many industrial and commercial applications, such as, for example, for molding or extruding into pipe, rods, films, and various containers.

A large proportion, however, of the polymer prepared in this manner is amorphous, ranging from heavy oils to wax-like solids, which are low strength, easily dissolved solids. This amorphous material has very limited usefulness, hence it is desirable that the polymers prepared have as large a proportion of crystalline polymer as possible.

It is an object of this invention to provide a process wherein a new catalytic system is used to polymerize alpha-olefins to relatively high molecular weight, predominantly crystalline polymers. It is another object to provide a new catalytic system for the polymerization of olefins. Other objects and their achievement in accordance with this invention will become apparent hereinafter.

It has now been found that predominantly crystalline polymers of alpha-olefins having from 2 to 8 carbon atoms may be prepared by contacting the olefin, under polymerizing conditions, with a catalyst system comprising a metal halide and activated carbon dispersed in an inert, liquid reaction medium.

The process of the invention is directed to the polymerization of alpha-olefins having from 2 to 8 carbon atoms. By "alpha-olefins," as used herein, is meant olefins which have a terminal olefinic linkage, i.e., a terminal carbon atom is attached through an olefinic double bond to the adjacent carbon atom. Ethylene, propylene, and mixtures of ethylene and propylene are the preferred alpha-olefins for use in the process of this invention, although other alpha-olefins, such as butene-1, 1,3-butadiene, and the pentenes, hexenes, heptenes and octenes having a terminal olefinic linkage, and mixtures thereof, can be used with good results. Such olefins, including the preferred normally gaseous olefins, or mixtures thereof, can be from any source, such as from the thermal or catalytic cracking of higher boiling hydrocarbons, from the dehydrogenation of paraffins, from the dehydration of alcohol, or the like. Saturated paraffins, such as ethane, propane and butane can be present and act as diluents. Other polymerizable materials such as styrene, vinyl chloride, and the like, can be present to an extent of about 25% by weight based on the alpha-olefin and good results obtained. When present, such other polymerizable materials appear to copolymerize with the alpha-olefin to give valuable copolymers.

The liquid organic reaction medium employed in preparing the reaction mixture should be anhydrous and substantially inert in the process. Saturated hydrocarbons such as the hexanes, heptanes, octanes, decanes, cyclohexanes, methylcyclohexane, decahydronaphthalene and homologues and mixtures thereof, for example, are preferred and give good results. Aromatic hydrocarbons such as benzene, toluene, xylene and the like, and mixtures thereof, can also be used with good results. Also, other organic compounds which are liquid under the conditions of operation and which are substantially inert in the process can be used, such as diethyl ether and other like materials.

The olefin is contacted with the metal halide and the activated carbon dispersed in the inert, liquid reaction medium under anhydrous and oxygen-free conditions, since water and oxygen will deactivate the catalyst. Room temperature and atmospheric pressure may be used, although temperatures of from 0° C. to about 250° C. can be used with good results. The use of the lower temperatures results in higher proportions of crystalline polymer, while higher rates of polymerization are obtained at temperatures in the upper portion of this range. Good results may also be obtained at pressures up to 10,000 p.s.i.g. (pounds per square inch gauge) and higher. It is necessary that sufficient pressure be used to maintain the reaction mixture in liquid phase. The olefin, metal halide, and activated carbon may be added to the reaction medium in any desired order, it only being necessary that all three be present together in order for polymerization to begin.

The metal halides suitable for the process of this invention are the chlorides and fluorides of metals of groups IV, Va and VIa, wherein the metal is at other than its lowest valence state. Titanium tetrachloride is the preferred metal halide, however other metal halides which give good results include vanadium pentachloride, molybdenum hexafluoride, lead tetrachloride, tungsten hexafluoride, zirconium tetrafluoride, and titanium tetrafluoride. The metal halide is added to the inert liquid reaction medium and there is contacted by the activated carbon, in a ratio of 0.1 to 12 moles of activated carbon per mole of metal halide.

The preferred activated carbon to use is that prepared by the thermal decomposition of aluminum carbide, although activated carbon prepared by other methods also gives good results. The preferred method of preparation of activated carbon comprises heating a stoichiometric mixture of aluminum powder and lampblack at 1850° C. in an inert atmosphere. When pressed cylinders of this material are heated to 1900–2000° C., appreciable crystal growth occurs to produce large, transparent yellow crystals of aluminum carbide. When these crystals are held for several hours at 2100–2400° C. in an inert atmosphere or in vacuo, they decompose to the elements. The aluminum is volatilized leaving the carbon as graphite crystals which are extremely reactive. These crystals will ignite spontaneously in air, hence it is necessary that they be maintained in an inert atmosphere.

The nature of the reaction between the activated carbon and the metal halide is not known for a certainty, but it is thought that an interstitial compound is formed; that is, that the metal halide is reduced and deposited in the lattice of the carbon crystal. At any rate, a highly reactive compound or complex is formed which catalyzes the polymerization of alpha-olefins to solid polymers.

Polymerization begins immediately when the olefin, metal halide, and activated carbon contact each other, as evidenced by a drop in the pressure in the reactor. Additional olefin is advantageously added from time to time to maintain the desired pressure. When polymerization is substantially complete, or when it is desired to stop it, excess olefin is vented off, and the reaction medium is drained. The remaining solid polymer is then contacted with a catalyst deactivator, such as water, alcohol, or an aqueous or alcoholic solution of an inorganic acid. Preferably this contacting also includes means which comminutes the polymer, so that catalyst particles which are embedded in the polymer may be washed out. The polymer is then repeatedly washed with water, alcohol, or a dilute inorganic acid, such as nitric acid, and then is dried. The resulting polymer is a white, predominantly crystalline solid having a molecular weight of from about 50,000 to 500,000 and a melting point of from about 160° C. to 170° C. This material is suitable for molding, extruding or otherwise fabricating into many useful products, such as thin films for wrapping materials, pipes for transporting fluids, and containers for corrosive fluids.

The following specific embodiment, in which "parts" refers to parts by weight, illustrates the invention:

A reactor fitted with a stirrer is partially filled with 1,000 parts of a mixture of saturated hydrocarbons (mostly octanes). To this are added 1.0 part of titanium tetrachloride and 0.5 part of activated carbon, that is, a mole ratio of carbon to titanium tetrachloride of approximately 8 to 1. Propylene in gas phase is injected into the resulting reaction mixture at a pressure of 250 p.s.i.g. Polymerization begins immediately, with the temperature of the reaction mixture maintained at 75° C. to 80° C. Additional propylene is added from time to time to maintain the pressure in the reactor. After 2 hours, the reaction is stopped, excess propylene vented, and the reaction medium drained off, leaving solid polymer. This polymer is transferred to a ball mill and flooded with methanol. The ball mill is run for one hour, grinding the polymer in the methanol. The methanol is then drained off and the polymer washed with an alcoholic solution of nitric acid, and then dried. The polypropylene product is a white solid having a molecular weight of from about 200,000 to 225,000, and a melting point of 164° C. A major proportion, above about 90%, of the polymer formed is crystalline, i.e., is insoluble in n-heptane boiling under atmospheric pressure.

Other alpha-olefins, such as ethylene, butene-1, 2-methyl pentene-1, and 1,3-butadiene, are also polymerized to high molecular weight solid polymers by the process described above.

The invention claimed is:

1. A process for preparing solid polymers of alpha-olefins which comprises admixing, in an inert, liquid reaction medium, an alpha-olefin having from 2 to 8 carbon atoms with a catalyst consisting essentially of activated carbon prepared by the thermal decomposition of aluminum carbide, and a metal halide selected from the group consisting of the chlorides and fluorides of the metals of groups IV, Va and VIa of the periodic table, wherein the metal is at other than its lowest valence state, at a temperature of from 0° C. to 250° C. and a pressure of from atmospheric to 10,000 p.s.i.g., and recovering predominantly crystalline solid polymers of the alpha-olefin.

2. A process as defined by claim 1 wherein the alpha-olefin is propylene.

3. A process as defined by claim 1 wherein the alpha-olefin is ethylene.

4. A process as defined by claim 1 wherein the metal halide is titanium tetrachloride.

References Cited in the file of this patent

UNITED STATES PATENTS

| 2,406,477 | Solomon et al. | Aug. 27, 1946 |
| 2,406,869 | Upham | Sept. 3, 1946 |

FOREIGN PATENTS

| 478,601 | Great Britain | Jan. 21, 1938 |